United States Patent Office 3,293,045
Patented Dec. 20, 1966

3,293,045
INCREASING THE FLAVOR STRENGTH OF ANETHOLE, CINNAMALDEHYDE AND METHYL SALICYLATE WITH MALTOL
Joan M. Griffin, Forest Hills, N.Y., assignor to Chas. Pfizer & Co., Inc., New York, N.Y., a corporation of Delaware
No Drawing. Filed Oct. 18, 1963, Ser. No. 317,126
3 Claims. (Cl. 99—134)

This application relates to new and novel flavoring compositions. More particularly, it concerns compositions comprising aromatic flavoring ingredients together with maltol, a gamma-pyrone. There are also contemplated foods, beverages, candy and tablets, syrups, medicinal oils, pill and tablet coatings and troches containing these flavoring compositions.

Among the most useful items of commerce are natural and synthetic flavors of the type represented by anise, cinnamon and wintergreen. These flavor essences, which provide the well known flavors of licorice, cinnamon and wintergreen, respectively, are widely employed in the manufacture of food, beverages and candy. In addition, the pharmacist has found them to be very useful in compounding prescriptions. For example, the abovementioned flavors, properly selected, are commonly employed for disguising salty or bitter and even nauseating medicines, which aids in the ingestion of the medicine by the patient.

A further use for these flavors, which is not particularly widely known, is to employ them as therapeutic agents. Thus, for example, both anise oil and wintergreen oil have long been known to be carminatives and cinnamon is often prescribed for the treatment of nausea and diarrhea. As with any therapeutic agent, the use of these materials in large quantities requires careful supervision by a physician so that problems of overdosages or adverse side reactions are minimized. Furthermore, one of them, wintergreen oil, has long been recognized as being toxic in large amounts. Because wintergreen oil smells like wintergreen candy, it is frequently ingested by children and has caused many fatalities.

Because of the physiological effects caused by ingestion of relatively large quantities of the active principles of anise, cinnamon and wintergreen oils, the governmental regulatory agencies responsible for controlling the permissive levels for all such materials in preparations manufactured for internal consumption are continually reviewing their employment. Recently, the tendency is for regulations to be issued which decrease the amount of such flavoring chemicals which may be used in materials to be ingested. For example, wintergreen oil is the subject of a proposed regulation which may limit the maximum amount to be employed to the neighborhood of about 300 parts per million in candy. Since the levels now used are commonly of the order of 600 to 8000 parts per million, it is seen that the characteristic flavor of ingestibles prepared with oil of wintergreen will be altered as the materials are compounded to accord with the regulations.

It has now been found that it is possible to decrease the amount of the flavoring compound added to ingestibles, such decrease being of the order of about one half or even less of the original material used, while at the same time maintaining the desirable and important flavoring and flavor disguising effects of the flavorants.

It is a principal object of the instant invention to provide a flavoring composition which may be added to ingestibles in lower effective minimum quantities than have previously been employed heretofore.

It is a further object of the instant invention to provide wintergreen-flavored candies which contain as their main flavoring ingredient wintergreen oil in lower minimum effective levels than have previously been employed.

These and other objects are readily achieved through use of the compositions of the instant invention which are, in essence: A flavoring composition comprising an agent selected from the group consisting of anethole, cinnamaldehyde and methyl salicylate and from about 15% to about 100% by weight thereof of maltol.

The instant invention contemplates the use of both natural and synthetic anise, cinnamon and wintergreen oils. It contemplates their use in the form of pure oils or blends of pure oils prepared either synthetically, being obtained by chemical reaction and distillation or, naturally, being obtained by extraction from the plant material from which the subject oils have been classically isolated. Generally speaking, the natural oils will, as described hereinafter, comprise predominantly one chemical entity together with isomers of this entity and minor amounts of various other compounds.

The following descriptions of the flavoring oils of the instant invention are taken from Remington's Practice of Pharmacy, Mack Publishing Co., 1961.

Anise oil is the volatile oil distilled with steam from the dried fruit *Pimpinella anisum* Linne or from the dried fruit of *Illicium verum* Hooker *filius*. It is used extensively as a flavoring agent, particularly for licorice candies and, as mentioned hereinbefore, it is often prescribed as a carminative. Carminatives are substances which relieve gaseous distention of the stomach or intestines. The chief constituent of anise oil is anethole, also known as para-propenyl anisole, which is present naturally to the extent of about 80 to 90%. The synthetic anise oil contemplated by the instant invention is the aforesaid anethole, also known as para-propenyl anisole.

Cinnamon oil is the volatile oil distilled with steam from the leaves and twigs of *Cinnamomum cassia* Nees ex Blume, rectified by distillation. It is comprised of not less than 80% by volume of aldehydes. Cinnamon oil is used as a flavor and to modify the action of gripping or drastic drugs. It is used in the treatment of flatulent colic. The synthetic cinnamon oil contemplated by the instant invention is cinnamaldehyde, which is often used to replace the natural oil as a flavor.

Wintergreen oil is obtained by maceration of the leaves of *Galutheria procumbens* Linne or the bark of *Betula lenta* Linne and subsequent distillation with steam. It is comprised almost completely of methyl salicylate. In addition to its use as a flavoring agent, methyl salicylate is used in the treatment of rheumatism, neuralgia and kidney diseases and is used as a carminative. The synthetic wintergreen oil contemplated by the instant invention is methyl salicylate which may be made, for example, by treatment of salicylic acid with methyl alcohol in the presence of sulfuric acid and distilling.

By the term foods are used herein and in the appended claims, it is meant to contemplate breads, cakes, pastries and frostings, and the like, in which the synthetic flavors are commonly employed. The term beverages contemplates, for example, soft drinks, punches, fruit juices, wines and liqueurs, and the like, in which these flavors are commonly employed. The term candy contemplates fruit drops and chocolate covered confections, hard, soft and chewy confections, including chewing gum and syrups, and the like. Pharmaceutical applications include compounded tablets, syrups, medicinal oils, coatings for pills and tablets and troches. A troche is a dosage form which is dissolved in the oral cavity slowly releasing the medicament contained therein.

While up until now the flavoring oils under consideration have been employed at levels of up to about 8000 parts per million and even more based on the product to be ingested, it is found that the content of the flavoring oil may be reduced to from about 50 to 300 parts per million based on the material to be flavored. In addition to providing for the ingestion of smaller quantities of the flavoring ingredient with the therapeutic activity mentioned hereinbefore, the instant invention also provides for a possible saving in the cost of some of the more expensive ingredients since less of the ingredient is required to give the desired flavor. It has been found that if a level of below about 50 parts per million of flavoring oil is used, the average test subject begins to find it difficult to appreciate the desired flavor. If, on the other hand, amounts of above about 300 parts per million of anise oil, cinnamon oil and wintergreen oil are used, it is obvious that the material to be ingested will contain more of the flavoring ingredient than it is anticipated will be permissible under the proposed federal regulations.

At the 50 to 300 parts per million level of the said flavoring oils, in the absence of maltol, relatively weak flavor strength is noted by those tasting the representative flavored confections, beverages and medicinal oils. It is found, however, that if there is added from about 15% to about 100% of maltol by weight based on the normally ineffective amount of said flavoring oil, the flavor receives such a boost that the test subjects find it difficult to distinguish over effects which are achieved only with amounts of the flavoring oil from about 600 to 800 parts per million and even more. In creme center candy, for example, it is found that 300 parts per million of methyl salicylate plus 100 to 125 parts per million of maltol is approximately equal in flavor strength to 600 to 800 parts per million of methyl salicylate alone.

As is well known, the flavoring agents which may be used in this invention are conveniently employed in vehicles consisting of solutions of the pleasantly flavored volatile oils in syrup or glycerin. A composition of about 1 part of oil per 500 parts of glycerine produces a particularly useful and stable preparation for pharmaceutical flavoring purposes. To make up such a vehicle, the compounder conveniently adds 2 ml. of the volatile oil, diluted with 6 ml. of alcohol to 500 ml. of glycerin or syrup which has been gently warmed. The solution is added a little at a time, with continuous shaking, and then sufficient glycerin or syrup is added to make 1000 ml. and mixed well. According to the present invention, a vehicle containing the volatile oil together with maltol is made by cutting back of the oil to about 1 ml., or other desired level, adding maltol in an amount of from about 15% to about 50% of the weight of the oil taken and compounding as outlined above. These vehicles may be kept in stock and used as the basis for prescribed medicines, the proper flavor being chosen in accordance with practices known to those skilled in the art or outlined in reference works such as Remington's Practice of Pharmacy.

The following specific examples illustrate the practice of the invention, but are not to be construed as limiting the scope of the invention in any way whatsoever.

*Example I*

A basic fondant plastic creme center formula for candy is prepared: In a vessel are placed 8 lbs. of granulated sugar, 2 lbs. of corn syrup, 1 lb. of invert sugar and enough water to dissolve the sugar. All of the ingredients are then heated together, stirring the batch occasionally until it boils. Any sugar grains which adhere to the vessel walls are washed down and the batch is heated until the temperature of the boiling mass reaches 240° F. The mixture is poured onto a clean, wet slab and is cooled to about 110° F. When it has reached this temperature it is creamed with a spatula and is stored until used.

Five batches of the fondant are mixed with methyl salicylate until there are obtained, respectively, one batch each with 50, 150, 300, 500 and 800 p.p.m. of methyl salicylate. Each of the batches containing methyl salicylate at 50, 150, 300 and 500 p.p.m. is itself divided into five batches. One of the batches containing 50 p.p.m. of methyl salicylate is left untreated and to the other four are added, respectively, enough maltol to provide batches containing 50, 75, 100 and 125 p.p.m. of maltol. These five batches are tasted by a panel and the flavors compared. It is found that the wintergreen flavor of all samples containing maltol is greater than the wintergreen flavor of the sample which does not contain maltol.

One of the batches containing 150 p.p.m. of methyl salicylate is treated with enough maltol to provide 100 p.p.m.; one of the batches containing 300 p.p.m. of methyl salicylate is treated with enough maltol to provide 100 p.p.m. A taste panel evaluation of these three blends is made and compared with the taste of fondant samples flavored with 300 p.p.m., 500 p.p.m. and 800 p.p.m. of methyl salicylate and to which no maltol has been added. The wintergreen taste with 150 p.p.m. of methyl salicylate and 100 p.p.m. of maltol is significantly greater than that of 150 p.p.m. of methyl salicylate alone but less than that of 300 parts of methyl salicylate alone; the wintergreen flavor with 300 p.p.m. of methyl salicylate and 125 p.p.m. of maltol is greater than that of 500 p.p.m. of methyl salicylate alone and less than that of 800 p.p.m. of methyl salicylate alone; and the flavor of 500 p.p.m. of methyl salicylate and 100 p.p.m. of maltol is also greater than 500 p.p.m. of methyl salicylate alone but less than that of 800 p.p.m. of methyl salicylate alone. Thus, it is clearly demonstrated that the flavor strength of 300 p.p.m. of methyl salicylate plus 125 p.p.m. of maltol (or 42% of maltol based on the methyl salicylate) is approximately equal to from at least 500 to about 800 p.p.m. of methyl salicylate alone. Furthermore, it is found that an appreciable boost in the wintergreen flavor is provided by maltol in amounts ranging from about 20% (500 p.p.m. of methyl salicylate with 100 p.p.m. of maltol) to 100% and even higher (50 p.p.m. of methyl salicylate with 50 p.p.m. of maltol based on the methyl salicylate).

*Example II*

A liqueur base is prepared by mixing together 4550 ml. of ethyl alcohol (90%), 5150 ml. of water and 400 ml. of a normal syrup. The normal syrup is prepared by boiling a mixture of 2 parts granulated sucrose and 1 part of water until the initial volume is reduced by one-third.

An anisette-type liqueur is prepared by adding anethole, also known as p-propenyl anisole, to a portion of the liqueur base in an amount sufficient to provide a concentration of 500 p.p.m. This is used as a basis of flavor strength evaluation in comparison with a series of liqueurs prepared by adding anethole and maltol to the liqueur base. It is found that 500 p.p.m. of anethole and 75 p.p.m. of maltol provide a flavor equivalent stronger than 500 p.p.m. but less than 800 p.p.m. of anethole alone. Furthermore, 300 p.p.m. of anethole and 125 p.p.m. of maltol provides a flavor strength very much greater than 500 p.p.m., but slightly less than 800 p.p.m. of anethole alone. The use of 150 p.p.m. of anethole with 100 p.p.m. of maltol provides a flavoring strength very much greater than 150 p.p.m. and only slightly less than 300 p.p.m. of anethole alone.

These results indicate that flavor levels equivalent to that produced by nearly 300 p.p.m. of anethole alone can be obtained with approximately ½ this amount of anethole if about 67% of maltol, based on the oil is added. Furthermore, if the amount of anethole is reduced by 40%, then 42% of maltol based on the remaining oil is sufficient to boost the flavor equivalency to that of the basic liqueur, which contains 500 p.p.m.

*Example III*

A hard candy cough drop base is prepared by melting 10 lbs. of granulated sugar down with 0.4 gallon of water in a kettle. The mixture is heated to about 160° C. then is cooled to 135° C. and is divided into portions. To one portion is added cinnamaldehyde in an amount to provide 500 p.p.m. and the mass is mixed well, rolled and cut into drops. To other portions are added cinnamaldehyde and maltol in measured amounts and drops are prepared. The drops are tasted and the flavor strengths are compared. It is found that the addition of 100 p.p.m. of maltol to the 500 p.p.m. of cinnamaldehyde containing base provides a flavor strength greater than 500 p.p.m. but less than that equivalent to 800 p.p.m. of cinnamaldehyde alone. A base containing 300 p.p.m. of cinnamaldehyde and 125 p.p.m. of maltol has a flavor equivalent very much greater than 500 p.p.m. but less than 800 p.p.m. of cinnamaldehyde alone. A base containing 150 p.p.m. of cinnamaldehyde and 100 p.p.m. of maltol has a flavor strength very much greater than 150 p.p.m. but less than p.p.m. of cinnamaldephyde alone.

These results show that the amount of cinnamaldehyde required to give a flavor equivalent to that of nearly 300 p.p.m. is only 150 p.p.m. if an amount of maltol equivalent to about 67% of the remaining cinnamon oil is provided.

What is claimed is:

1. A method for flavoring foodstuffs and medicines which comprises incorporating therein from about 50 to about 300 parts per million of an agent selected from the group consisting of anethole, cinnamaldehyde, and methyl salicylate and from about 15% to about 100% of maltol by weight of said agent.

2. A method for flavoring foods, candy, tablets, syrups, medicinal oils, pill and tablet coatings and troches which comprises incorporating therein from about 50 to about 300 parts per million of methyl salicylate and from about 15% to about 100% of maltol by weight of said methyl salicylate.

3. A wintergreen-flavored candy which contains at its main flavor-imparting ingredients from about 50 to about 300 parts per million of methyl salicylate and from about 15% to about 100% of maltol by weight of said methyl salicylate.

References Cited by the Examiner

UNITED STATES PATENTS

| | | | |
|---|---|---|---|
| 3,015,654 | 1/1962 | Hodge et al. | 99—140 X |
| 3,130,204 | 4/1964 | Tate et al. | 99—140 X |
| 3,159,652 | 12/1964 | Tate et al. | 99—140 X |

A. LOUIS MONACELL, *Primary Examiner.*

JOSEPH M. GOLIAN, *Examiner.*